United States Patent [19]

Ito

[11] Patent Number: 4,887,017
[45] Date of Patent: Dec. 12, 1989

[54] SEAT ANGLE REGULATING APPARATUS

[75] Inventor: Sadao Ito, Toyoake, Japan

[73] Assignee: Aisin Seiki Kabushiki Kaisha, Kariya, Japan

[21] Appl. No.: 105,037

[22] Filed: Oct. 6, 1987

[30] Foreign Application Priority Data

Oct. 14, 1986 [JP] Japan .................... 61-243761

[51] Int. Cl.$^4$ ............................................. G05G 5/00
[52] U.S. Cl. ...................................... 318/626; 318/103; 318/466
[58] Field of Search ................................ 318/560–561, 318/600–602, 626, 568, 466–468, 103; 296/64–65; 297/330

[56] References Cited

U.S. PATENT DOCUMENTS

| 4,355,270 | 10/1982 | Cook et al. | 318/466 |
| 4,451,887 | 5/1984 | Harada et al. | 318/466 |
| 4,698,571 | 10/1987 | Mizuta et al. | 318/568 |
| 4,728,873 | 3/1988 | Inoue et al. | 318/466 |

Primary Examiner—William M. Shoop, Jr.
Assistant Examiner—David Martin
Attorney, Agent, or Firm—Finnegan, Henderson, Farrabow, Garrett & Dunner

[57] ABSTRACT

A seat angle regulating apparatus comprises: an upper arm mounted to a seat back of a seat; a lower arm mounted to a seat cushion of the seat; an internal gear and an external gear; an angle regulating unit having an eccentric shaft; a motor for rotating the eccentric shaft; and a locking unit for engaging and disengaging the angle regulating unit to and from either of said upper arm or said lower arm. The best feature of the present invention is that the angle regulating unit has a motor rotation control unit for controlling the forward and backward rotation range of the motor and enabling the rotation of the motor within a predetermined rotation range. The motor rotation control unit comprises: two components relatively moved by the motor; a first switch for detecting the relative position located at one end of rotation range of the two components; a second switch for detecting the other relative position located at the other end of rotation range of the same; and a motor controller for turning the motor on and off in accordance with the input from the first and second switch. Thus the seat angle regulating apparatus can recline the seat back within the predetermined range appropriately, and avoid damaged or worn out terminals and terminal plate used in the conventional seat regulating apparatus, malfunction due to contact failure or short circuit between the terminals and the terminal plate, and failure of seat back locking for the full-forward-reclining position.

13 Claims, 8 Drawing Sheets

SEAT ANGLE REGULATING APPARATUS

BACKGROUND OF THE INVENTION

1. Field of the Invention

The present invention relates to a seat angle regulating apparatus.

2. Description of the Prior Art

Figure 12:
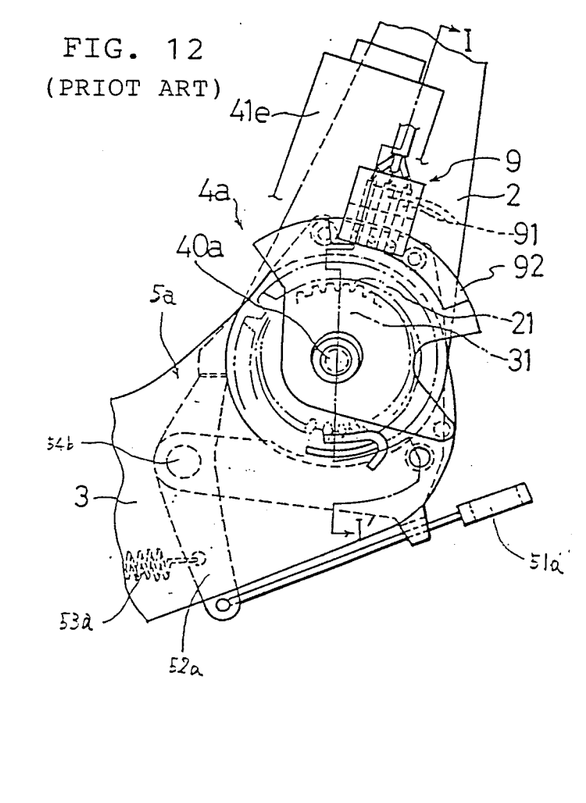
FIG. 12 is an enlarged front view of major sections of a conventional seat angle regulating apparatus.
Figure 13:
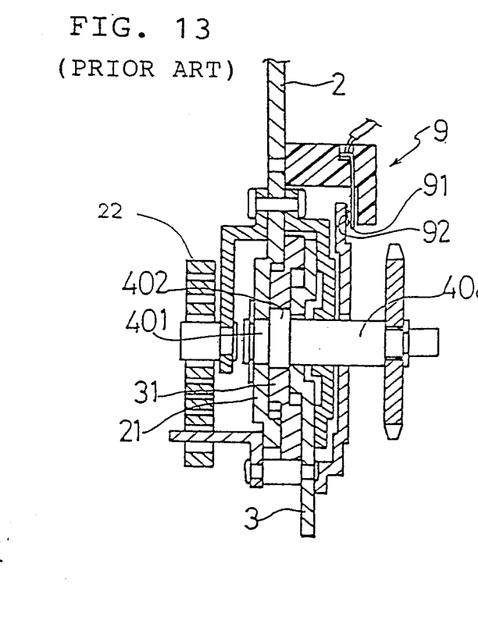
FIG. 13 is a sectional view taken in the direction of arrows along line I—I' of FIG. 12.

An example of a conventional seat angle regulating apparatus's arrangement is shown in FIG. 12 and FIG. 13. The conventional seat angle apparatus has the following:

an upper arm 2 mounted to a seat back 12 of a seat 1, a lower arm 3 mounted to a seat cushion 12 of a seat 1, an internal gear 21 and an external gear 31, having teeth at least one tooth less than the number of teeth of the internal gear 21, in mesh between the upper arm 2 and the lower arm 3 for regulating the relative angle between the upper arm 2 and the lower arm 3, an angle regulating unit 4a having an eccentric shaft 40a for rotatably supporting the internal gear 21 at a concentric portion 401 thereof and rotatably supporting the external gear 31 at an eccentric portion 402 thereof and engaging the internal gear 21 and the external gear 31 in mesh, and a motor 41e for rotating the eccentric shaft 40a, and a locking unit 5a for engaging and disengaging said angle regulating unit 4a to and from either of said upper arm 2 or said lower arm 3 and changing the relative angle between said upper arm 2 and said lower arm 3 independently of said angle regulating unit 4a when said angle regulating unit 4a is disengaged.

Further, a switch mechanism 9 for turning the motor 41e on and off is provided to the conventional seat angle regulating apparatus. The switch mechanism 9 has three terminals 91 retained on the upper arm 2 and an arc-shaped terminal plate 92 fixed on the lower arm 3. The terminals 91 move with the upper arm 2 while contacting with the arc-shaped terminal plate 92. The switch mechanism 9 works as follows:

When the terminal 91 at the left hand side in FIG. 12 leaves the arc-shaped terminal plate 92, an electric current supply to the motor 41e stops and the step-less forward reclining stops. When the terminal 91 at the right hand side in FIG. 12 leaves the arc-shaped terminal plate 92, the electric current supply to the motor 41e also stops and the step-less backward reclining stops. Thus the seat angle regulating unit regulates the step-less reclining range of the seat back 12 of the seat 1.

Furthermore, the full-forward-reclining locking state can be released by operating the locking unit 5a. The locking unit 5a has an operating lever 51a, a locking pole 52a, a tension spring 53a, and a pole shaft 54b. When the operating lever 51a is pulled, the locking pole 52a turns in the counterclockwise direction in FIG. 12 around the pole shaft 54b. Then a projected portion of the external gear 31 is disengaged from the pole 52a. And the upper arm 2 and the external gear 31 are reclined like one body fully in the counterclockwise direction in FIG. 12; i.e. forward direction, because the upper arm 2 is urged in the counterclockwise direction by the spiral spring 22 (shown in FIG. 13).

PROBLEMS WITH THE PRIOR ART

The arrangement of the conventional seat angle regulating unit has the following problems:

(1) Since the terminals 91 contact with and move on the arc-shaped terminal plate 92 and an electric current flows between the terminals 91 and the arc-shaped terminal plate 92 during the full-forward-reclining and full-backward-reclining of the seat back 12 of the seat 1, electric sparks occur and damage the terminals 91. And since the terminals 91 move over a long distance on the arc-shaped terminal plate 92 in a short period of time, the terminals 91 and the arc-shaped terminal plate 92 wear out quickly.

(2) Since the terminals 91 and the arc-shaped terminal plate 92 are exposed, a failure contact and a short circuit occur when dust exists between the terminals 91 and the arc-shaped terminals 92.

(3) Even when the terminal 91 at the right hand side leaves the arc-shaped terminal plate 92; i.e. the terminals 91 are at the limit position to stop the electric current supply for the step-less reclining of the seat back 12 of the seat 1 in the backward direction, and the motor 41e is turned off, the terminals 91 might be put back to positions capable of turning on the motor 41e if the locking unit 5a is operated to release the full-forward-reclining locking. If such is the case, the seat back 12 moves in the forward direction, and the terminals 91 are put back to positions capable of turning on the motor 41e when the seat back 12 is manually held at the neutral position of the step-less-reclining. As a result, the seat back 12 is further reclined in the backward direction beyond the initially designed full-backward-reclining range. In this case, the seat back 12 cannot be locked in the full-backward-reclining state because the projected portion of the external gear 31 turns with the seat back 12 to the position where the projected portion cannot engage with the pole 52a.

Accordingly, it is an object of the present invention to solve the problems of the conventional seat angle regulating apparatus mentioned above.

SUMMARY OF THE INVENTION

A seat angle regulating apparatus according to the present invention comprises the following:

an upper arm mounted to a seat back of a seat;

a lower arm mounted to a seat cushion of said seat;

an internal gear and an external gear having teeth at least one tooth less than the number of teeth of said internal gear in mesh between said upper arm and said lower arm for regulating the relative angle between said upper arm and said lower arm;

an angle regulating unit having an eccentric shaft for rotatably supporting either of said internal gear or said external gear at a concentric portion thereof and rotatably supporting the other gear at an eccentric portion thereof and engaging said internal gear and said external gear, and a motor for rotating said eccentric shaft; and a locking unit for engaging and disengaging said angle regulating unit to and from either of said upper arm or said lower arm and changing the relative angle between said upper arm and said lower arm independently of said angle regulating unit when said angle regulating unit is disengaged.

And the present invention features that said angle regulating unit has a motor rotation control unit for controlling the forward and backward rotation range of said motor and enabling the rotation of said motor within said rotation range.

According to a seat angle regulating apparatus thus constructed, the step-less reclining of the seat back can be performed without failure by actuating a motor in a constant range smaller than the full-reclining range. Since no terminals and terminal plate exposed to the outside are required, it is possible to avoid the generation of electric sparks due to the terminals and terminal plate, and it is also possible to avoid damaged and worn out terminals.

Among the component members constructing the seat angle regulating apparatus according to the present invention, the upper arm, the lower arm, and the locking unit may use the same arrangements as those of the conventional seat angle regulating apparatus.

The angle regulating unit features a motor rotation control unit will be explained later. It has the following as well as the motor rotation control unit:

an internal gear and an external gear having the same arrangements as those of the conventional seat angle regulating unit, an eccentric shaft for rotating either of the gears eccentrically, and a motor for rotating the eccentric shaft.

The motor rotation control unit controls the forward and backward rotation range of the motor, and enables the rotation of the motor within the range. In addition, the motor rotation control unit can recline the seat back within a predetermined step-less reclining range.

The motor rotation control unit may be mounted to a component member driven by the motor. For instance, it may be mounted to any one of the following component members as desired:

the eccentric shaft (or first eccentric shaft), joined to a driven sprocket, for rotating gear of said upper arm, a second eccentric shaft, disposed away from said first eccentric shaft and joined to a driving sprocket, for transmitting the rotation of the motor, or a third eccentric shaft disposed between said first eccentric shaft for rotating the gear of the upper arm and said second eccentric shaft for transmitting the rotation of the motor. (In this case, it is desired that said third eccentric shaft is joined to a second driven sprocket, and that the second driven sprocket is engaged with a chain spanned between said driven and driving sprockets.)

The motor rotation control unit may have two components relatively moved by the motor, a first switch for detecting the relative position located at one end of a rotation range of the two components, a second switch for detecting the other relative position located at the other end of the rotation range of the same, and a motor controller for turning the motor on and off in accordance with the input from the first and second switches. When this arrangement is employed, the motor can be turned on and off without the conventional switch mechanism; i.e. the terminals and terminal plate contacting with the terminals.

Further, the motor rotation control unit may have an epicyclic gear reducer, and the first and second switch may be mounted to the epicyclic gear reducer. When this arrangement is employed, the operations of turning the first and second switch on and off become smooth, because the first and second switches move with the epicyclic gear reducer moving at a slow speed.

The two components relatively moved by the motor may be a second external gear and a second internal gear comprising the angle regulating unit.

Furthermore, the motor rotation control unit may employ a rotary encoder for measuring number of the motor rotations, and a motor controller for turning the motor on and off in accordance with the input from the rotary encoder. When this arrangement is employed, no mechanical switches; i.e. the first and second switches are required, because the motor rotation is stopped automatically when the number of the motor rotations has reached a predetermined number, and because the motor does not rotate any further.

OPERATION OF THE INVENTION

In the seat angle regulating unit according to the present invention, the angle regulating unit has the motor rotation control unit for controlling the forward and backward rotation range of the motor and enabling the rotation of the motor within the rotation range.

The motor rotation control unit of the angle regulating unit starts operating when the motor is actuated either in the forward or the backward direction to recline the seat back of the seat held by the locking unit at the neutral lock position, either in the forward or the backward direction. After the motor is actuated for a desired period of time and is turned off manually, the motor stops the rotation, and the seat back is fixed at a certain reclining angle.

When the motor is kept turned on manually, the seat back continues reclining in the forward direction beyond the neutral lock position or in the backward direction as far as the seat back is within the step-less reclining range. However, when the motor rotation amount reaches a predetermined limit, the motor rotation control unit automatically controls and stops the motor rotation.

In addition, either the upper arm or the lower arm may be disengaged from the angle regulating unit by operating the locking unit. By doing so, the relative angle of the upper arm in relation to the lower arm is changed greatly and independently of the angle regulating unit. However, even when the seat back has been fully reclined in the forward direction or the backward direction, the motor rotation control unit swings only when the step-less reclining range independently of the relative positions of the upper arm and the lower arm in the full-forward-reclining and full-backward-reclining states.

ADVANTAGES OF THE PRESENT INVENTION

It is possible to control the reclining movement of seat back electrically by a motor efficiently, because the seat angle regulating apparatus according to the present invention has a seat angle regulating unit for regulating the forward and backward rotation range of the motor, and a motor rotation control unit for enabling the rotation of the motor within the rotation range.

Consequently, the seat angle regulating apparatus according to the present invention can regulate the forward and backward rotation range of the motor, and generate only the necessary number of motor rotations when reclining the seat back in the step-less manner. In addition, it is possible to recline the seat back appropriately, because the seat angle regulating apparatus according to the present invention has the motor rotation control unit arranged as explained above.

Furthermore, the seat angle regulating apparatus according to the present invention can avoid the following problems associated with the conventional seat angle regulating apparatus:

Damaged or worn out terminals,

Malfunction of the seat angle regulating apparatus due to a failure contact or a short circuit between the terminals and the terminal plate, and Failure of the seat back locking mechanism for full-forward-reclining.

DETAILED DESCRIPTION OF THE PREFERRED EMBODIMENTS

First Preferred Embodiment

A first preferred embodiment of the seat angle regulating apparatus according to the present invention will be hereinafter explained with reference to FIGS. 1 to 4.

Figure 1:
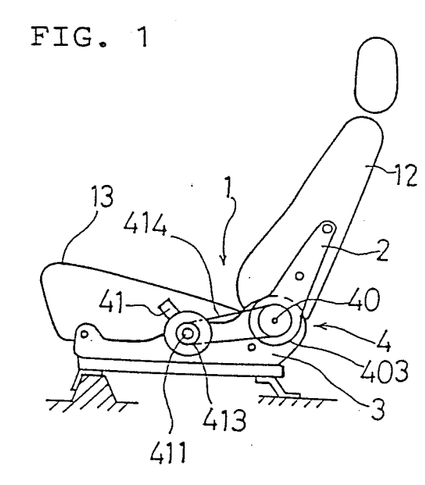
FIG. 1 is a front view illustrating a first preferred embodiment.
Figure 2:
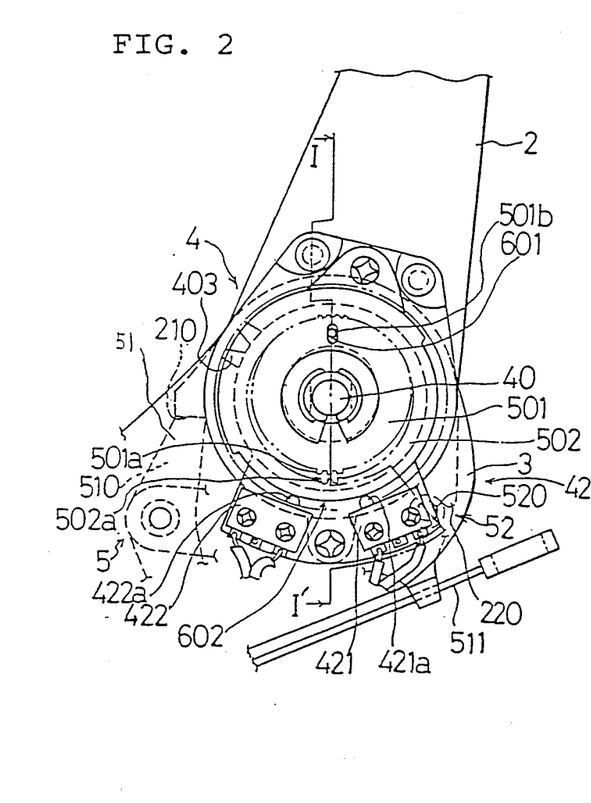
FIG. 2 is an enlarged front view of major sections of the first preferred embodiment illustrated in FIG. 1.
Figure 3:
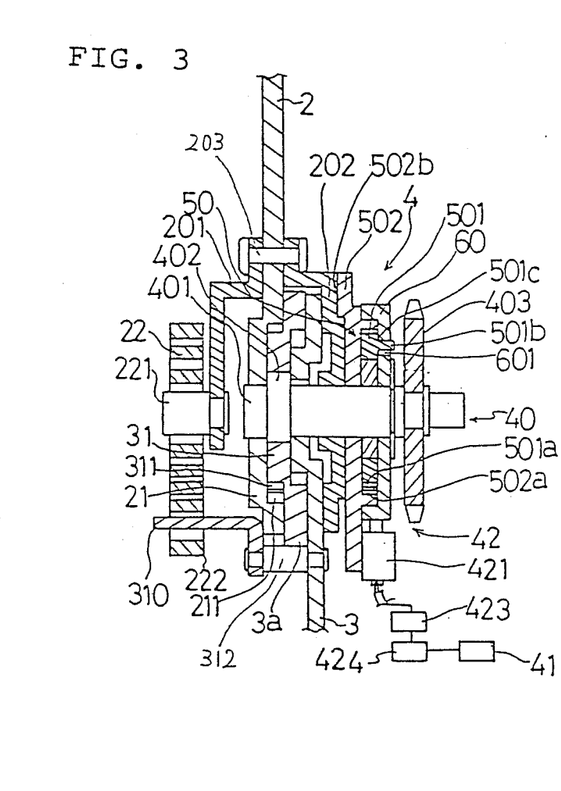
FIG. 3 is a sectional view taken in the direction of arrows along line I—I' of FIG. 2.

As shown in FIG. 1 as a front elevation view, FIG. 2 as a partially cutaway view, and FIG. 3 as a cross-sectional view, the first preferred embodiment has an upper arm 2, a lower arm 3, an angle regulating unit 4, and a locking unit 5.

The first preferred embodiment features a motor rotation control unit 42 as the angle regulating unit 4.

As embodied herein, the upper arm 2, the lower arm 3, the locking unit 5, and a first internal gear 21 and a first external gear 31 of the angle regulating unit 4 may employ the component members of the conventional seat angle regulating apparatus. If such is the case, such component members will be hereinafter explained by using the same numerals used in the "Description of the Prior Art" section and shown in FIGS. 12 and 13.

The upper arm 2 is mounted to the seat back 12 of the seat 1, and it is engaged to the lower arm 3 of a seat cushion 13 by an eccentric shaft 40 later explained.

Figure 4:
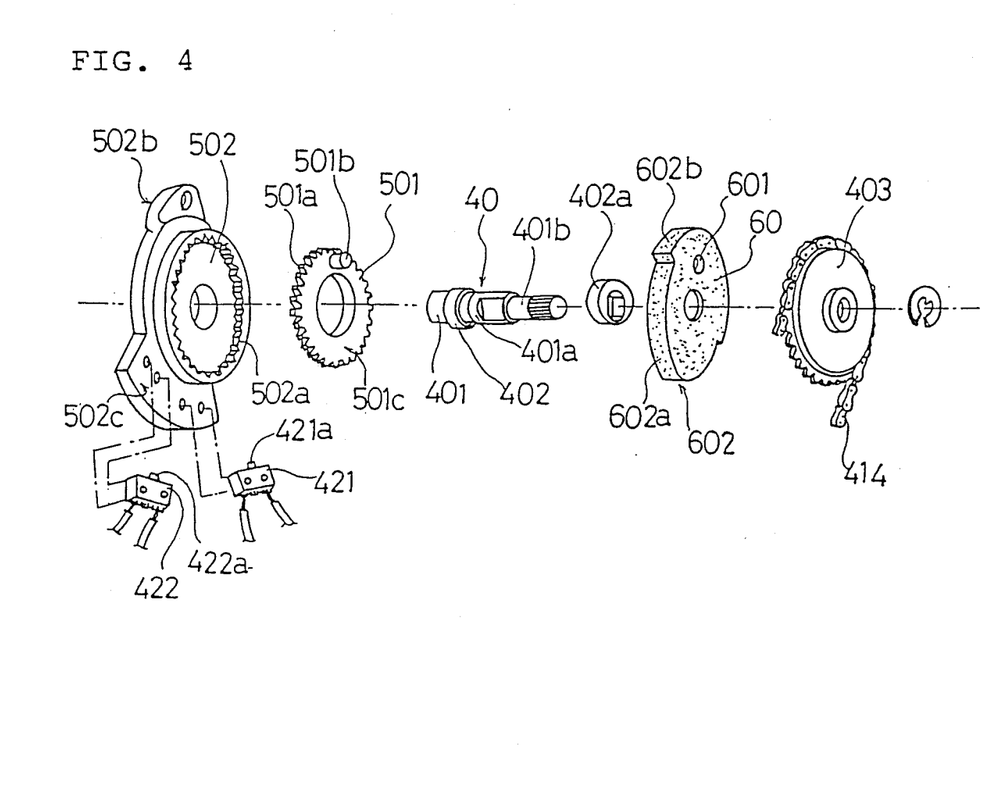
FIG. 4 is an exploded perspective view of major sections of FIG. 3.

The eccentric shaft 40 has a coaxial portion 401 for rotatably supporting the first internal gear 21 formed on the upper arm 2, and an eccentric portion 402 for rotatably supporting the first external gear 31 formed on a lower plate 3a joined to the lower arm 3 by screws or rivet joints (not shown). In addition, as shown in FIG. 4, the eccentric shaft 40 has a second coaxial portion 401a for rotatably supporting a second internal gear 502, a second eccentric portion 402a for rotatably supporting a second external gear 501, and a third coaxial portion 401b for rotatably supporting a cam 60. Said second external gear 501, second internal gear 502 and cam 60 compose the motor rotation control unit 42 later explained.

Said first internal gear 21 regulates the relative angle between the upper arm 2 and the lower arm 3. The first internal gear 21 has internal gear teeth 211, and the first external gear 31 has external gear teeth 311. The number of gear teeth 311 is less than the number of gear teeth 211 by at least one.

Said eccentric shaft 40 rotatably supports the first internal gear 21 at the coaxial portion 401, and rotatably supports the first external gear 31 at the eccentric portion 402, which is engaged with the first internal gear 21 in mesh.

The motor rotation control unit 42 controls the forward and backward rotation range of the motor 41. The motor 41 rotates within the rotation range, and rotates the eccentric shaft 40. In this first preferred embodiment, the motor 41 is mounted to the lower arm 3.

As shown in FIG. 1, a chain 414 is spanned between a driven sprocket 403 joined to one end of the eccentric shaft 40 and a driving sprocket 413 joined to the rotary shaft 411 of the motor 41. Thus the forward and backward rotation of the motor 41 is transmitted to the eccentric shaft 40 through the driving sprocket 413, the chain 414 and the driven sprocket 403.

The upper arm 2 is always urged by a spiral spring 22 in the counterclockwise direction in FIG. 2. In other words, as shown in FIG. 3, a projected portion 310, joined to the lower arm 3 by a rivet joint 312, is secured to an outer periphery end 222 of the spiral spring 22. The spiral spring 22 is retained by a first upper plate 201 fixed to one end surface of the upper arm 2 by a rivet joint 203 at a central inner end 221 thereof.

The motor rotation control unit 42 has an epicyclic gear reducer 50 driven by the rotation of the motor 41. The gear reducer 50 is composed of a second external gear 501 and a second internal gear 502. A first switch 421 and a second switch 422 is mounted to the epicyclic gear reducer 50.

The motor rotation control unit 42 has two components relatively moved by the rotation of the motor 41; i.e. the second external gear 501 and the second internal gear 502 composing the angle regulating unit 4 as shown in an exploded view in FIG. 4. Further, the motor rotation control unit 42 has the first switch 421 positioned at one end of the rotation range of the second external gear 501 and the second internal gear 502 for detecting the relative position of the second external gear 501 and the second internal gear 502, and the second switch 422 positioned at the other end of the rotation range of the second external gear 501 and the second internal gear 502 for detecting the relative position of the second external gear 501 and the second internal gear 502, and a motor controller 423 for turning the motor 41 on and off through a driver 424 in accordance with the input from the first switch 421 and the second switch 422.

The aforementioned second external gear 501 is rotatably supported by the second eccentric portion 402a of the eccentric shaft 40. The second eccentric shaft portion 402a may be an eccentric brushing fitted into a portion of the eccentric shaft 40. The second internal gear 502 is rotatably supported by the second coaxial portion 401a of the eccentric shaft 40. The second internal gear 502 has second internal gear teeth 502a, and the second external gear 501 has second external gear teeth 501a. The number of second internal gear teeth 501a is less than the number of second internal gear teeth 502a by at least one.

As can be seen from the above explanation, the second external gear 501 and the second internal gear 502 are engaged in mesh, and their meshing position is moved in accordance with the rotation of the eccentric shaft 40. Thus the second internal gear 502 rotates at a decelerated speed. Moreover, an end surface 502b of the second internal gear 502 is fixed to a second upper plate 202 by screws or rivet joints (not shown), and the second upper plate 202 is fixed to the end surface of the upper arm 2 by screws or rivet joints.

An engaging nose 501b projecting in the direction opposite to the second upper plate 202 is formed on the other end surface 501c of the second external gear 501. The engaging nose 501b is secured to the cam 60 while being inserted through a slot 601 of the cam 60.

The cam 60 is rotatably supported by the third coaxial portion 401b of the eccentric shaft 40. A cam surface 602 having a reduced diameter section 602a and an increased diameter section 602b is formed on the outer periphery of the cam 60 as shown in FIG. 4. The first switch 421 and the second switch 422 are fixed and mounted to an end surface 502c of the second internal gear 502 as mentioned earlier.

And an actuating portion 421a of the first switch 421 and an actuating portion 422a of the second actuating portion 422 are positioned on the reduced diameter portion 602a of the cam surface 602.

When the actuating portions 421a and 422a are positioned on the reduced portion 602a of the cam surface 602, it is possible to supply and keep supplying an electric current to an actuating electric circuit (not shown) of the motor 41. When either of the actuating portion 421a or 422a is brought into contact with the increased diameter section 602b, the actuating electric circuit (not shown) of the motor 41 is opened up.

The locking unit 5 disengages the external gear 31 of the angle regulating unit 4 from the lower arm 3 to change the relative angle between the upper arm 2 and lower arm 3 greatly. The locking unit 5 has a first locking member 51 for locking the full-forward-reclining of the seat back 12, and a second locking member 52 for locking the full-backward-reclining of the seat back 12. A first engaging nose 210 engaging with the first locking member 51 and a second engaging nose 220 with a second locking member 52 is formed on the upper arm 2.

The first locking member 51 for locking the full-forward-reclining has a first locking pole 510 rotatably supported by the lower arm 3, a tension spring (not shown) for always urging and engaging the first locking pole 510 with the first engaging nose 210 formed on the upper arm 2, and an operating lever 511 for turning the locking pole 510 against the urging force of the tension spring and releasing the full-forward-locking.

The second locking member 52 for locking the full-backward-reclining has a second locking pole 520. The second locking pole 520 is rotatably supported by the lower arm 3, and has a latch portion (not shown) formed thereon for engaging the second locking pole 520 with the second engaging nose 220 formed on the portion of the upper arm 2.

According to the thus constructed first preferred embodiment of the seat angle regulating apparatus, the relative angle between the upper arm 2 and the lower arm 3 can be changed greatly and independently of the angle regulating unit 4 by disengaging the lower arm 3 from the first external gear 31 of the angle regulating unit 4.

Namely, when the full-forward-reclining is desired, the first locking pole 510 is disengaged from the first engaging nose 210 by pulling the operating lever 511. Then, the first external gear 31 is released from the locking unit 5 and disengaged from the lower arm 3. The first external gear 31 rotates in the counterclockwise direction. Thus the upper arm 2 is reclined with the external gear 31 fully in the counterclockwise direction in FIG. 2; i.e. fully in the forward-direction, because the upper arm 2 is urged by the spiral spring 22 in the counterclockwise direction.

Likewise, when the full-backward-reclining is desired, the latch portion (not shown) of the second locking pole 520 is disengaged from the second engaging nose 220 by pressing the operating lever 511. Then, the first external gear 31 is released from the locking unit 5 and disengaged from the lower arm 3. The first external gear 31 rotates in the clockwise direction. Thus the upper arm 2 is reclined with the first external gear 31 fully in the clockwise direction in FIG. 2; i.e. fully in the backward-direction, because the clockwise rotation of the external gear 31 uncoils the spiral spring 22.

Note that the rotation of the motor 41 causing the step-less reclining is not transmitted to the first external gear 31 when the first engaging nose 210 or the second engaging nose 220 is released from the locking unit 5.

The first preferred embodiment of the seat angle regulating apparatus has the motor rotation control unit 42, having the aforementioned arrangement, as the angle regulating unit 4. The operations of the first preferred embodiment will be hereinafter explained.

First, the motor 41 is actuated to regulate the reclining angle of the seat back 12 of the seat 1 from the usual reclining angle; i.e. the reclining position usually used by a driver or a navigator, to a desired reclining angle. And the driving sprocket 413 is rotated by the rotation of the motor 41. The rotation of the motor 41 is transmitted to the driven sprocket 403 via the chain 414. And the eccentric shaft 40 is rotated either in the clockwise direction or counterclockwise direction depending on the rotation direction of the motor 41. Then, the second external gear 501 rotatably supported by the second eccentric portion 402a of the second eccentric shaft 40 is rotated while engaging its second external gear teeth 501a with the second internal gear teeth 502a. Accordingly, the internal gear 502 is rotated either in the clockwise or counterclockwise direction. And then, the upper arm 2 is rotated around the coaxial portion 401 of the eccentric shaft 40 by the torque transmitted through the first external gear 31 and the first internal gear 21 interlocking with the rotation of the second internal gear 502. Finally, the seat back 12 of the seat 1 is reclined either in the forward or backward direction.

The aforementioned rotation of the second internal gear 502 is transmitted to the cam 60 by way of the enganging nose 501b and the slot 601. Accordingly, the first switch 421 and the second switch 422 fixed on one end surface 502c of the second internal gear 502 move while bringing their switch actuating portions 421a and 422a contact with the reduced diameter portion 602a of the cam surface 602.

When the cam 60 has been turned to either one of the limits of the turning range, namely when either of the switch actuating portion 421a or 422a has been pressed by the increased diameter portion 602b of the cam surface 602, the motor control unit 423 is energized to control and stop the rotation of the motor 41 via the driver 424.

Thus the angle regulating unit 4 enables the rotation of the motor 41 in the forward and backward rotation range, and stops the operation of the motor 41 outside the rotation range.

Second Preferred Embodiment

Figures 5, 6:
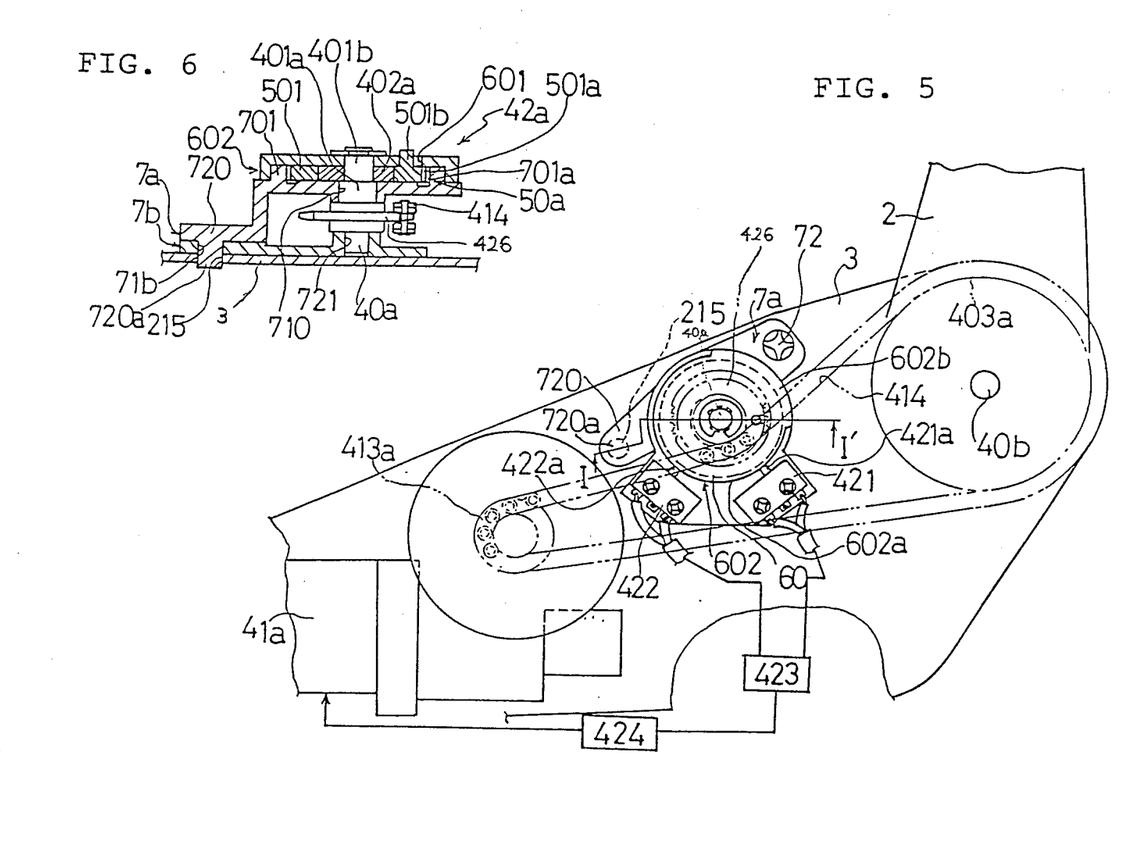
FIG. 5 is an enlarged front view of major sections of a second preferred embodiment.
FIG. 6 is a sectional view taken in the direction of arrows along line I—I' of FIG. 5.

A second preferred embodiment of the seat angle regulating apparatus according to the present invention will be hereinafter explained with reference to FIGS. 5 and 6.

The second preferred embodiment has the following:

a motor rotation control unit 42a having an epicyclic gear reducer 50a.

a driving sprocket 413a rotated by a motor 41a, and a driven sprocket 403a joined to an eccentric shaft 40b which rotates an upper arm 2.

The second preferred embodiment features said motor rotation control unit 42a disposed between said driving sprocket 413a and the driven sprocket 403a. Here, an epicyclic gear reducer 50a has a second internal gear 701 and a second external gear 501.

The motor rotation control unit 42a of the second preferred embodiment has the following:

a mounting hole 710 for placing a second eccentric shaft 40a at the center thereof, a mounting member 720 with an engaging nose 720a on the outer periphery thereof, and a first base member 7a with the second internal gear 701 having gear teeth 701a, and the second internal gear 701 is formed on the opposite side of the mounting member 720 with respect to the mounting hole 710.

The motor rotation control unit 42a is mounted at a portion of the lower arm 3 placing a second base member 7b with a mounting hole 721 for placing the second eccentric shaft 40a therebetween. In other words, the engaging nose 720a is fitted and inserted into a retaining hole 71b of the second base member 7b and a fixing hole 215, and thus the first base member 7a and the second base member 7b are fixed to the lower arm 3 by a mounting screw 72 integrally.

Further, the eccentric shaft 40a is rotatably supported by the mounting hole 721 of the second base member 7b and the mounting hole 710 of the first base member 7a. Furthermore, the eccentric shaft 40a is provided with a second driven sprocket 426. As shown in FIGS. 5 and 6, the second driven sprocket 426 is interlocking with a chain 414. The chain 414 is spanned between the driving sprocket 413a rotated in the forward and backward direction in accordance with the rotation of the motor and the driven sprocket 403 joined to the eccentric shaft 40b for engaging the upper arm having the internal gear (not shown) and the lower arm having the external gear (not shown). The rotation of the motor 41a is transmitted to the driven sprocket 403a and the second driven sprocket 426 through the chain 414. Here, the motor 41a of the second preferred embodiment is mounted to the lower arm 3.

Other component members are identical with those explained in the section of the first preferred embodiment, and designated by the same numerals of the first preferred embodiment.

Since the operations and advantages of the second preferred embodiment are the same as those of the first preferred embodiment, they will not be explained.

Third Preferred Embodiment

Figure 7:
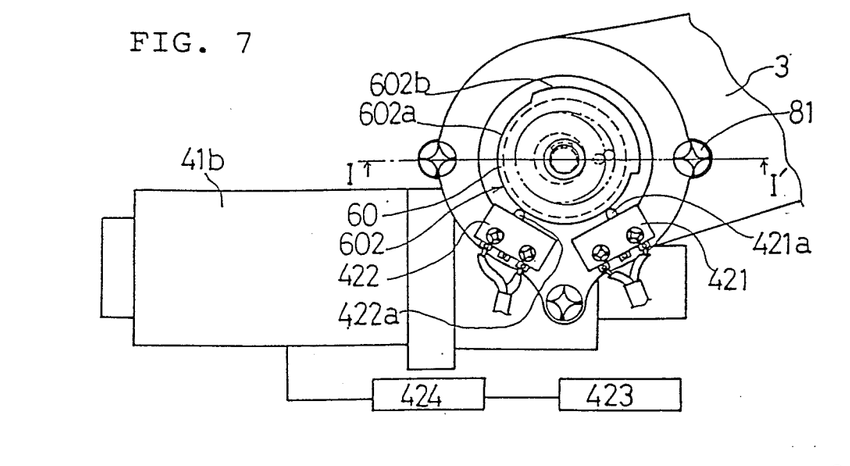
FIG. 7 is an enlarged front view of major sections of a third preferred embodiment.
Figure 8:
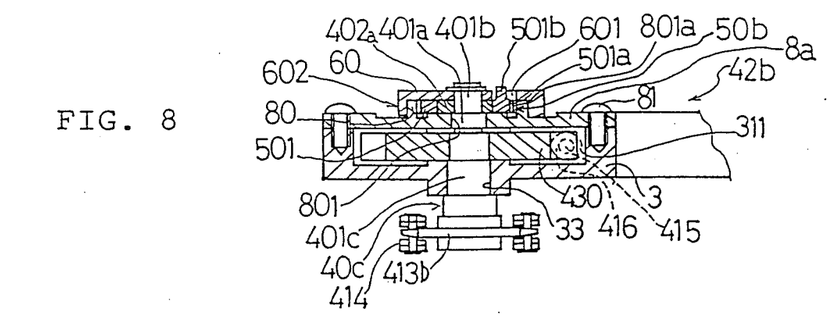
FIG. 8 is a sectional view taken in the direction of arrows along line I—I' of FIG. 7.

A third preferred embodiment of the seat angle regulating apparatus according to the present invention will be hereinafter explained with reference to FIGS. 7 and 8.

The third preferred embodiment has the following:

a motor rotation control unit 42b having an epicyclic gear reducer 50b, and a driving sprocket 413b rotated by a motor 41b.

The third preferred embodiment features said motor rotation control unit 42b joined to the center portion of said driving sprocket 413b, and disposed on a second eccentric shaft 40c rotatably supported by a lower arm 3. Here, the epicyclic gear reducer 50b has a second internal gear 80 and a second external gear 501.

The motor rotation control unit 42b of the third preferred embodiment has the following component members, and they are assembled together:

a second eccentric shaft 40c whose intermediate coaxial portion 401c is rotatably supported by a mounting hole 33 of the lower arm 3.

a driving sprocket 413b joined to one end of the second eccentric shaft 40c, a gear 430 disposed in a concave portion 311 formed on the lower arm 3, and engaging in mesh with pinion teeth 416 formed on the pinion shaft 416 of the motor 41b, and a base member 8a having a second internal gear 80 formed on the center portion thereof.

The base member 8a covers said concave portion 311 of the lower arm 3, and the periphery thereof is fixed to the lower arm 3 by mounting screws 81. And a center hole 801 of the base member 8a supports a second concentric portion 401a of the second eccentric shaft 40c.

The gear 430 engaging with the pinion teeth 416 of the pinion shaft 415 of the motor 41b mounted to the lower arm 3 is fixed to the second eccentric shaft 40c. Accordingly, the gear 430 and the second eccentric shaft 40c rotate simultaneously.

Further, a chain 414 is spanned between the driving sprocket 413b joined to one end of the eccentric shaft 40c and the driven sprocket (designated by 403a in FIG. 5 but not shown in FIG. 7) joined to the first eccentric shaft (designated by 40b in FIG. 5, but not shown in FIG. 7) rotatably supporting an upper arm 2 (not shown in FIG. 7) and the lower arm 3.

Other component members are identical with those explained in the section of the first preferred embodiment, and designated by the same numerals of the first preferred embodiment.

Since the operations and advantages of the third preferred embodiment are the same as those of the first preferred embodiment other than that the angle regulating unit 42b is disposed on and joined directly to the motor 41b, they will not be explained.

Fourth Preferred Embodiment

Figure 9:
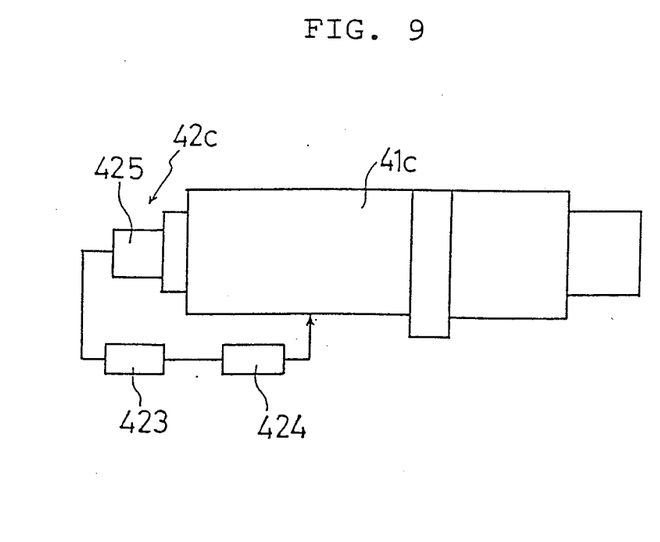
FIG. 9 is a front view of a fourth preferred embodiment.

Though aforementioned first, second, and third preferred embodiments employ the epicyclic gear reducers 50, 50a, and 50b respectively as the motor rotation control unit, a fourth preferred embodiment employs a rotary encoder 425 for measuring a number of rotations of a motor 41c, and a motor control unit 423 for turning the motor 41c on and off in accordance with the input from the rotary encoder 425 as a motor rotation control unit 42c.

To be concrete, the rotary encoder 425 is disposed on a rotary shaft of the motor 41c as shown in FIG. 9. When the number of rotations of the motor 41c has reached a predetermined number, the motor control unit 423 is energized to control and stop the rotation of the motor 41c via a driver 424 in accordance with the input from the rotary encoder 425. Thus the motor rotation control unit 42c regulates the forward-reclining and backward-reclining range of a seat back 12 of seat 1.

Even when this arrangement is employed, the rotation of the motor 41c may be transmitted to an eccentric shaft 40c for rotatably supporting an upper arm 2 and a lower arm 3 in the same manner explained in the sections of the first, second and third preferred embodiments.

Fifth Preferred Embodiment

A fifth preferred embodiment of the seat angle regulating apparatus according to the present invention will be hereinafter explained with reference to FIGS. 10 and 11. The same component members are designated by the same numerals used in FIGS. 1 through 3, because the fifth preferred embodiment has the same arrangements as the first preferred embodiment except the following arrangements.

Figures 10, 11:
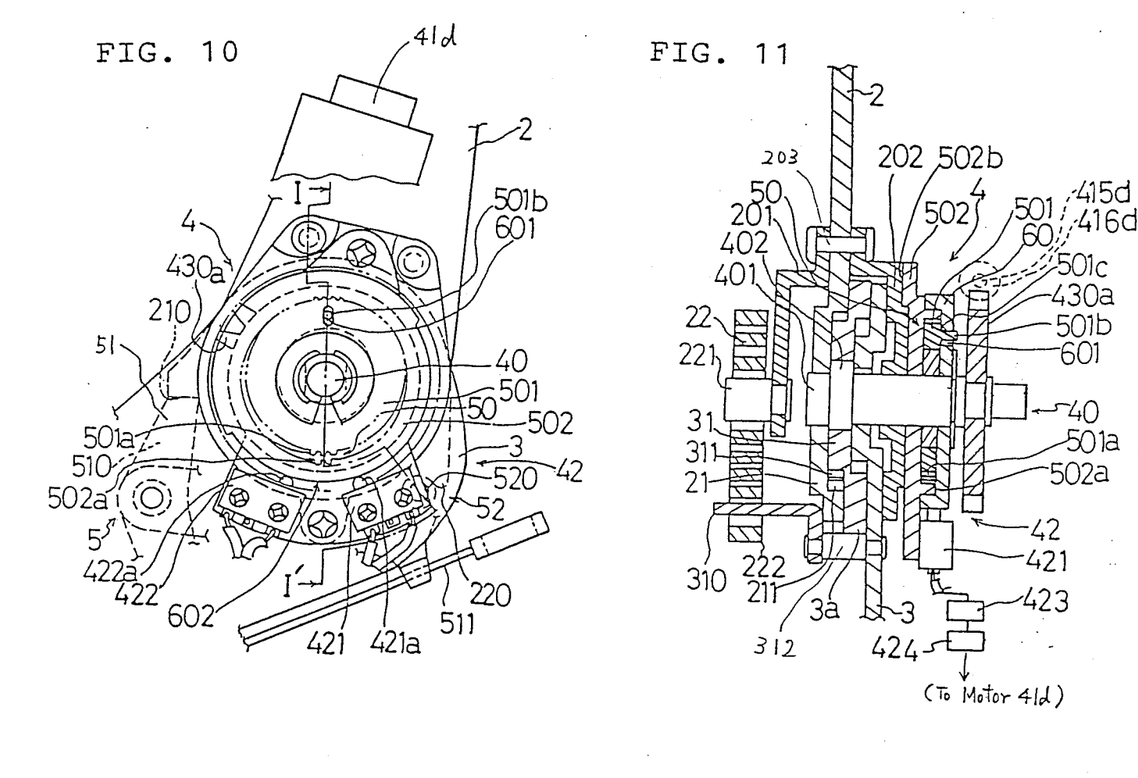
FIG. 10 is an enlarged front view of major sections of a fifth preferred embodiment.
FIG. 11 is a sectional view taken in the direction of arrows along line I—I' of FIG. 10.

As can be seen from FIGS. 10 and 11, the fifth preferred embodiment has a gear 430a fixed to one end of the eccentric shaft 40 instead of the driven sprocket 430 shown in FIGS. 2 and 3. Thus the rotation of the motor 41d is transmitted directly to the gear 430a. As the gear 430a is fixed to the eccentric shaft 40, and engaged with a pinion shaft 415d of the motor 41d, it rotates simultaneously with the eccentric shaft 40. Here, the motor 41d is mounted to the upper arm 2.

Since the operations and advantages of the fifth prefered embodiment are the same as those of the first preferred embodiment other than that it transmits the rotation of the motor 41d to the eccentric shaft 40 directly instead of via the chain transmission illustrated in the first preferred embodiment, they will not be explained.

What is claimed is:

1. A seat angle regulating apparatus comprising:
   an upper arm mounted to a seat back of a seat;
   a lower arm mounted to a seat cushion of said seat;
   an internal gear having a first set of teeth, and an external gear having a second set of teeth, said second set of teeth numbering at least one less than said first set of teeth, said internal and external gears in mesh between said upper arm and said lower arm for regulating a relative angle between said upper arm and said lower arm;
   an angle regulating unit having an eccentric shaft for rotatably supporting either of said internal gear or said external gear at a concentric portion thereof and rotatably supporting the other gear at an eccentric portion thereof and engaging said internal gear and external gear, and a motor for rotating said eccentric shaft; and
   a locking unit for engaging and disengaging said angle regulating unit to and from either of said upper arm or said lower arm and changing the relative angle between said upper arm and said lower arm independently of said angle regulating unit when said angle regulating unit is disengaged;
   said angle regulating unit including a motor rotation control unit for controlling a forward and backward rotation range of said motor and enabling the rotation of said motor within said rotation range.

2. A seat angle regulating apparatus according to claim 1, wherein said motor rotation control unit has two components relatively moved by said motor, a first switch for detecting the relative position located at one end of rotation range of said two components, a second switch for detecting the other relative position located at the other end of rotation range of the same, and a motor controller for turning said motor on and off in accordance with the input from said first and second switches.

3. A seat angle regulating apparatus according to claim 2, wherein said motor rotation control unit has an epicyclic gear reducer, and said first and second switches are mounted to said epicyclic gear reducer.

4. A seat angle regulating apparatus according to claim 2, wherein said two components moved by said motor are a second external gear and a second internal gear.

5. A seat angle regulating apparatus according to claim 1, wherein said motor rotation control unit has a rotary encoder for measuring number of rotations of said motor, and a motor controller for turning said motor on and off in accordance with the input from said rotary encoder.

6. A seat angle regulating apparatus according to claim 1, wherein said motor rotation control unit is mounted to said eccentric shaft.

7. A seat angle regulating apparatus according to claim 1, wherein said motor rotation control unit is mounted to a second eccentric shaft for transmitting the rotation of said motor.

8. A seat angle regulating apparatus according to claim 1, wherein said motor rotation control unit is mounted to a third eccentric shaft disposed between said eccentric shaft and said second eccentric shaft.

9. A seat angle regulating apparatus according to claim 2, wherein said first and second switches are snap-action switches.

10. A seat angle regulating apparatus comprising:
    an upper arm mounted to a seat back of a seat;
    a lower arm mounted to a seat cushion of said seat;
    a first internal gear having a first internal set of teeth, and a first external gear having a first external set of teeth, said first external set of teeth numbering at least one less than said first internal set of teeth, said first internal and external gears in mesh between said upper arm and said lower arm for regulating a relative angle between said upper arm and said lower arm;
    an angle regulating unit having an eccentric shaft for rotatably supporting one of said first internal gear and said first external gear at a first concentric portion thereof and rotatably supporting the other of said first internal gear and said first external gear at a first eccentric portion thereof, and engaging said first internal gear and first external gear, and a motor for rotating said eccentric shaft; and
    a locking unit for engaging and disengaging said angle regulating unit to and from one of said upper arm and said lower arm and changing the relative angle between said upper arm and said lower arm independently of said angle regulating unit when said angle regulating unit is disengaged;
    said angle regulating unit including a motor rotation control unit for controlling a forward and backward rotation range of said motor and enabling the rotation of said motor within said rotation range; the motor rotation control unit including an epicyclic gear member including a second internal gear having a second internal set of teeth rotatably supported at a second concentric portion of said eccentric shaft and a second external gear having a second external set of teeth, said second external set of teeth numbering at least one less than said second internal set of teeth, and rotatably supported at a second eccentric portion of said eccentric shaft, a cam rotatably supported at a third concentric portion of said eccentric shaft and engaging with said second external gear so as to regulate the rotation of said second external gear, a first switch for detecting the relative position located at one end of a rotation range of said second internal gear and said second external gear mounted to said epicyclic gear member and in contact with said cam, a second switch for detecting the other relative position located at the other end of the rotation range of said second internal gear and said second external gear mounted to said epicyclic gear member and in contact with said cam, and a motor controller for turning said motor on and off in accordance with the input from said first and second switches.

11. A seat angle regulating apparatus according to claim 10, wherein said motor is connected to directly drive said eccentric shaft.

12. A seat angle regulating apparatus comprising:
an upper arm mounted to a seat back of a seat;
a lower arm mounted to a seat cushion of said seat;
a first internal gear having a first internal set of teeth and a first external gear having a first external set of teeth, said first external set of teeth numbering at least one greater than said first internal set of teeth, said first internal and external gears in mesh between said upper arm and said lower arm for regulating a relative angle between said upper arm and said lower arm;
an angle regulating unit including a first eccentric shaft for rotatably supporting one of said first internal gear and said first external gear at a concentric portion thereof and rotatably supporting the other of said first internal gear and said first external gear at an eccentric portion thereof and engaging said first internal gear and first external gear, and a motor for rotating said first eccentric shaft; and
a locking unit for engaging and disengaging said angle regulating unit to and from one of said upper arm and said lower arm and changing the relative angle between said upper arm and said lower arm independently of said angle regulating unit when said angle regulating unit is disengaged;
said angle regulating unit including a motor rotation control unit for controlling a forward and backward rotation range of said motor and enabling the rotation of said motor within said rotation range; said motor rotation control unit including a second eccentric shaft disposed independently of said first eccentric shaft and driven by said motor, an epicyclic gear member including a second internal gear having a second internal set of teeth rotatably supported at a first concentric portion of said second eccentric shaft and a second external gear having a second external set of teeth, said second external set of teeth numbering at least one less than said second internal set of teeth, and rotatably supported at an eccentric portion of said second eccentric shaft, a cam rotatably supported at a second concentric portion of said second eccentric shaft and engaging with said second external gear so as to regulate the rotation of said second external gear, a first switch for detecting the relative position located at one end of a rotation range of said second internal gear and said second external gear mounted to said epicyclic gear member and in contact with said cam, a second switch for detecting the other relative position located at the other end of the rotation range of said second internal gear and said second external gear mounted to said epicyclic gear member and in contact with said cam, and a motor controller for turning said motor on and off in accordance with the input from said first and second switches.

13. A seat angle regulating apparatus according to claim 12, wherein said motor is connected to directly drive said second eccentric shaft.

* * * * *